United States Patent
Chen

[11] Patent Number: 6,027,235
[45] Date of Patent: Feb. 22, 2000

[54] NUMBER PLATE HOUSING

[76] Inventor: Yu-Liang Chen, 5F, No. 17, Lane 77, Yuan Shan Rd., Chung Ho City, Taipei Hsien, Taiwan

[21] Appl. No.: 09/121,667

[22] Filed: Jul. 23, 1998

[51] Int. Cl.[7] .............................. B60Q 1/00; B60Q 1/064; B60Q 1/076; B60Q 3/00
[52] U.S. Cl. .......................... 362/497; 362/800; 362/544; 362/545
[58] Field of Search ..................................... 362/499, 497, 362/540, 541, 545, 800, 249, 544; 40/204, 205, 556, 208

[56] References Cited

U.S. PATENT DOCUMENTS

| | | | |
|---|---|---|---|
| 4,857,890 | 8/1989 | Solow | 340/479 |
| 5,666,749 | 9/1997 | Waters | 40/204 |

Primary Examiner—Cassandra Spyrou
Assistant Examiner—Leo Boutsikaris
Attorney, Agent, or Firm—Smith, Gambrell & Russell, LLP

[57] ABSTRACT

A number plate housing mainly includes a front, a middle and a back member firmly assembled together to protect a number plate set therein from dust and thieves. The front and the back members are provided with studs which can engage with stud receiving holes formed on the middle member to tightly and firmly connect the three members together. A stepped recess provided along rear outer periphery of the back member engages with an inward extended flange around rear outer periphery of the front member further ensures tight seal of the middle member and the number plate in and between the front and the back members. The middle member has a central convexo-convex portion which magnifies figures on the number plate for easy reading. Light units each having multiple light emitting diodes are connected to the middle member so that the number plate can be illuminated in the dark. And, the light units can also serve as additional brake lights.

8 Claims, 5 Drawing Sheets

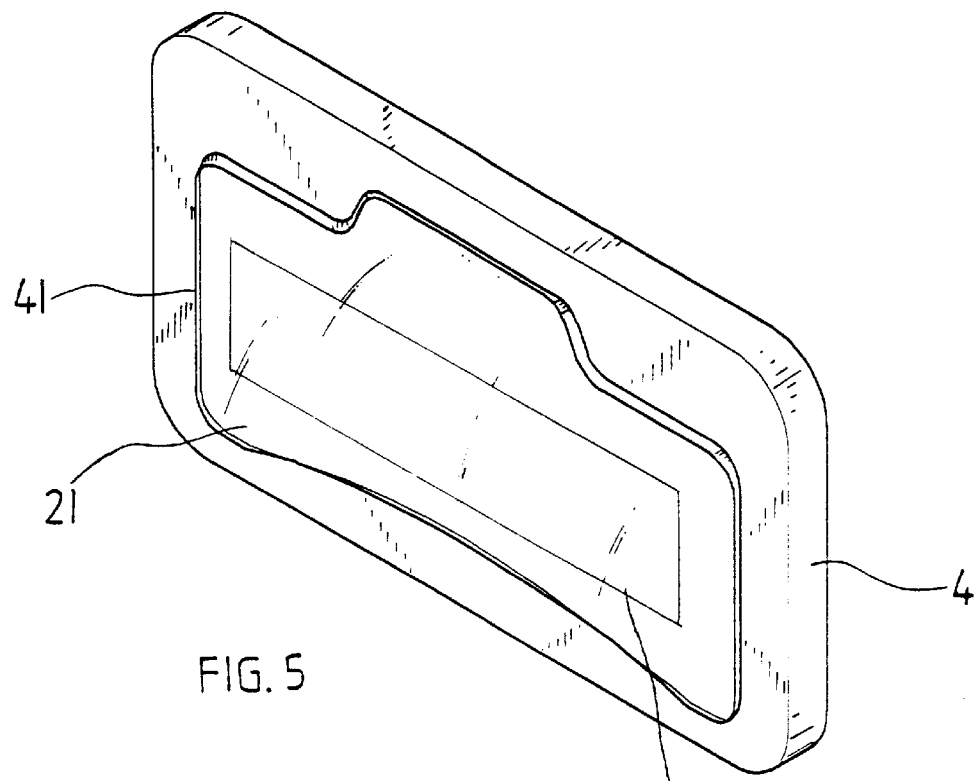
FIG. 5
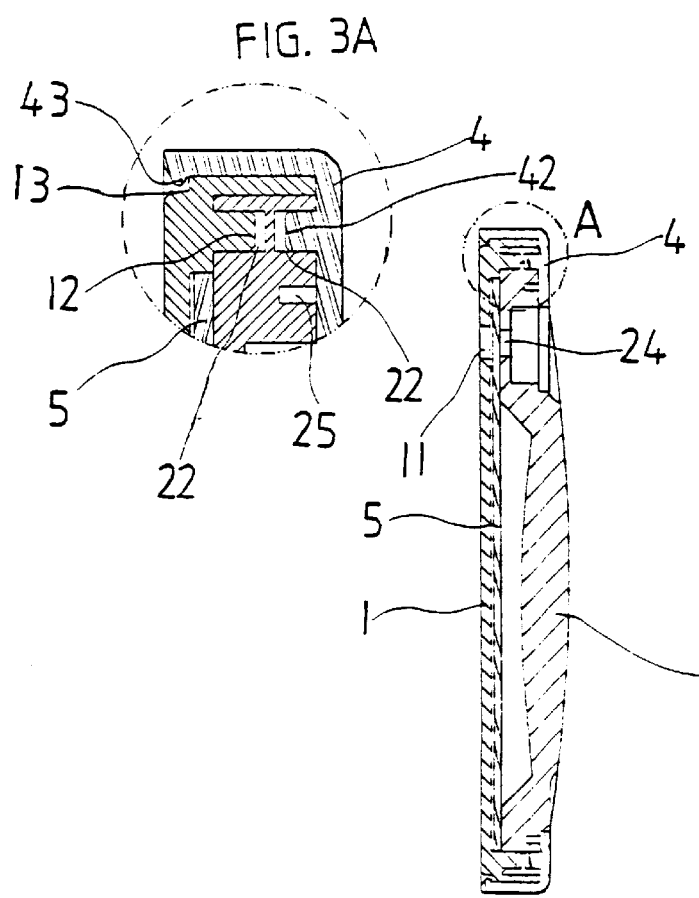
FIG. 3A
FIG. 3

NUMBER PLATE HOUSING

BACKGROUND OF THE INVENTION

1. Field of the Invention

The present invention relates to a number plate housing, and more particular to a number plate housing which magnifies numbers on the number plate for easy reading and protects the number plate from dust and thieves. And, light emitting diodes in different color groups are provided in the number plate housing to serve as additional brake light to provide enhanced safety in driving.

2. Description of the Prior Art

The largely increased cars and motorcycles in our prosperous commercial and industrial society have, on the one hand, brought more convenience to our transportation in daily life, and on the other hand, been utilized by some people as means to commit crimes. Number plates are originally designed as means for managing the cars and motorcycles. However, they are frequently dusted, purposely partially changed, or shielded in different ways to sufficiently encourage those bad guys to commit crimes by using their cars or motorcycles without worrying about being arrested.

One expedient way currently adopted to prevent the using of cars as means to commit crimes is to request taxi drivers to paint the figures of their number plate on the rear window of the car in an enlarged scale. This way has, however, adverse influence on the appearance of the car and is currently limited to taxicabs and is therefore somewhat an insult to those good taxi drivers. People can still use private cars and motorcycles to commit crime.

It is therefore desirable to develop means for enhancing functions of the number plates of cars and motorcycles, so that cars and motorcycles can be more effectively managed and controlled.

SUMMARY OF THE INVENTION

A primary object of the present invention is to provide a number plate housing which includes front, middle, and back members tightly assembled together to frame a number plate. The middle member is a convexo-convex lens which magnifies figures on the number plate for easy reading.

Another object of the present invention is to provide the above number plate housing which further includes light units each having multiple light emitting diodes thereon. The light emitting diodes are grouped into different colors, so that the light units not only illuminate the number plate set in the housing but also serve as an additional brake light of the car or motorcycle.

A further object of the present invention is to provide the above number plate housing in which the front and the back members are provided with studs and the middle member is provided with first stud receiving holes, so that the front, the middle, and the back members can be tightly assembled together without being easily separated from one another by engaging the studs with the first stud receiving holes.

A still further object of the present invention is to provide the above number plate housing in which a stepped recess is provided along a rear outer periphery of the back member and an inward extended flange is provided along a rear outer periphery of the front member, such that the front member may be firmly closed to the back member by engaging the inward extended flange with the stepped recess. The number plate can therefore be set in the housing and protected from dust.

A still further object of the present invention is to provide the above number plate housing in which second stud receiving holes having larger diameter than the first stud receiving holes are provided on the middle member adjacent to the first stud receiving holes. Whereby, the front, the middle, and the back members can be loosely assembled for packing purpose by engaging the studs on the front and the back members with the large-diameter second stud receiving holes on the middle member.

BRIEF DESCRIPTION OF THE DRAWINGS

A more complete understanding of these and other features and advantages of the present invention will become apparent from a careful consideration of the following detailed description of certain embodiments illustrated in the accompanying drawings, wherein:

FIG. 3 is a side sectional view of the number plate housing of the present invention in an assembled state;

FIG. 3A is a fragmentary, enlarged sectional view of FIG. 3 to show the assembling of the present invention more clearly;

FIG. 5 is a perspective showing a number plate being set in the present invention and the numbers on the plate are magnified.

DETAILED DESCRIPTION OF THE PREFERRED EMBODIMENTS

Figure 1:
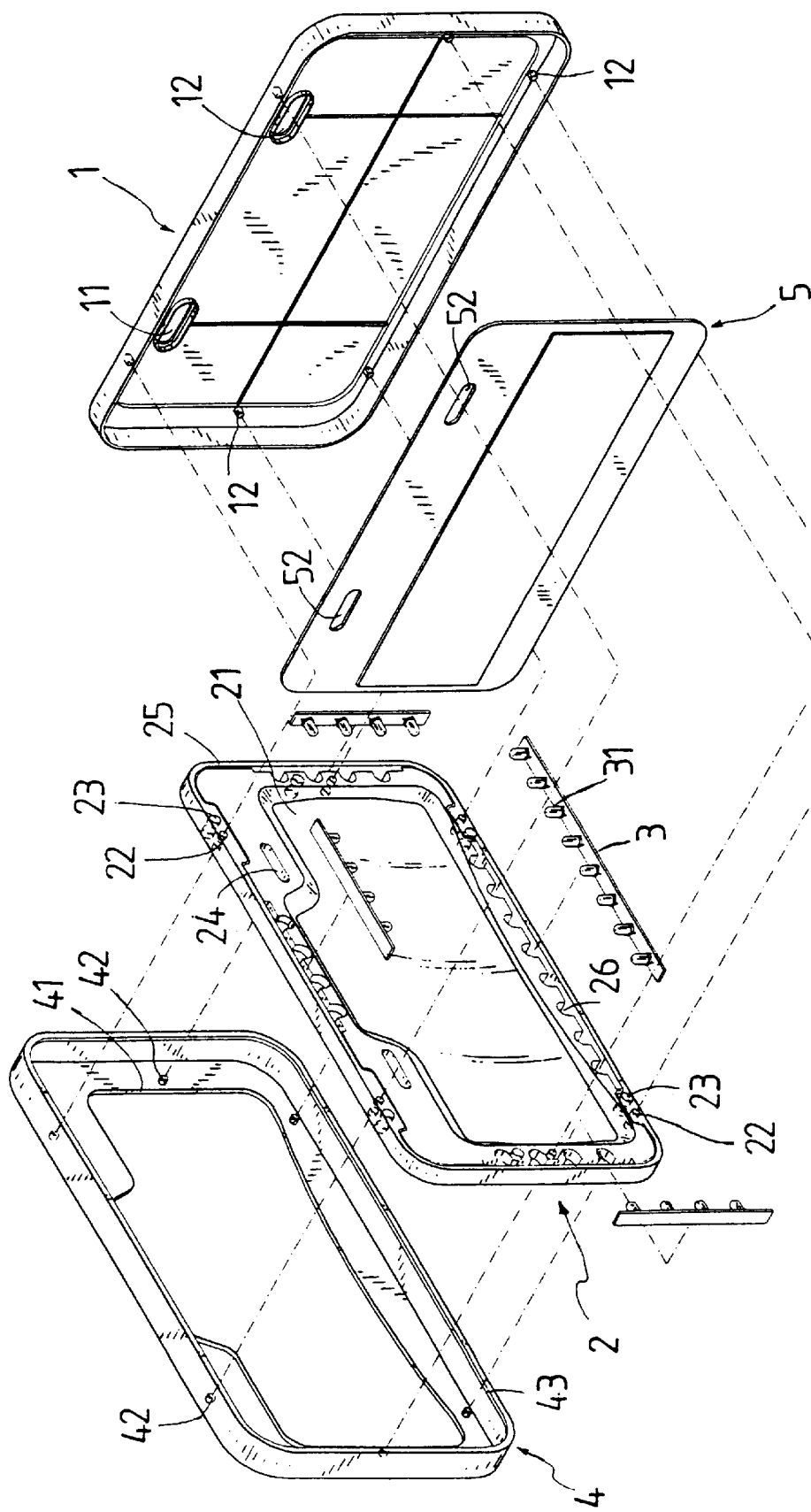
FIG. 1 is an exploded perspective of present invention.

Please refer to FIGS. 1, 3, and 3A. The present invention relates to a number plate housing which mainly includes a back member 1, a middle member 2, a number of light units 3, and a front member 4. A number plate 5 is set in the back member 1 and behind the middle member 2 and has two fixing holes 52 provided near an upper edge thereof.

The back member 1 is in the form of a shallow tray having a large flat back wall and four forward extended low side walls that together defining a forward opening for the back member 1. Two through holes 11 are formed on the back wall at positions corresponding to the fixing holes 52 of the number plate 5. Forward projected studs 12 are provided on the back wall of the back member 1 near the joint of the back wall and the side walls. Two of the studs 12 are symmetrically located at suitable positions adjacent to left and right side walls, and the other four of the studs 12 form two pairs that are separately and asymmetrically located at suitable positions adjacent to upper and lower side walls. The back member 1 is provided along a rear outer periphery of the four side walls with a continuously extended recess 13, such that the back member 1 has four stepped outer back edges, as shown in FIGS. 3 and 3A.

Figure 6:
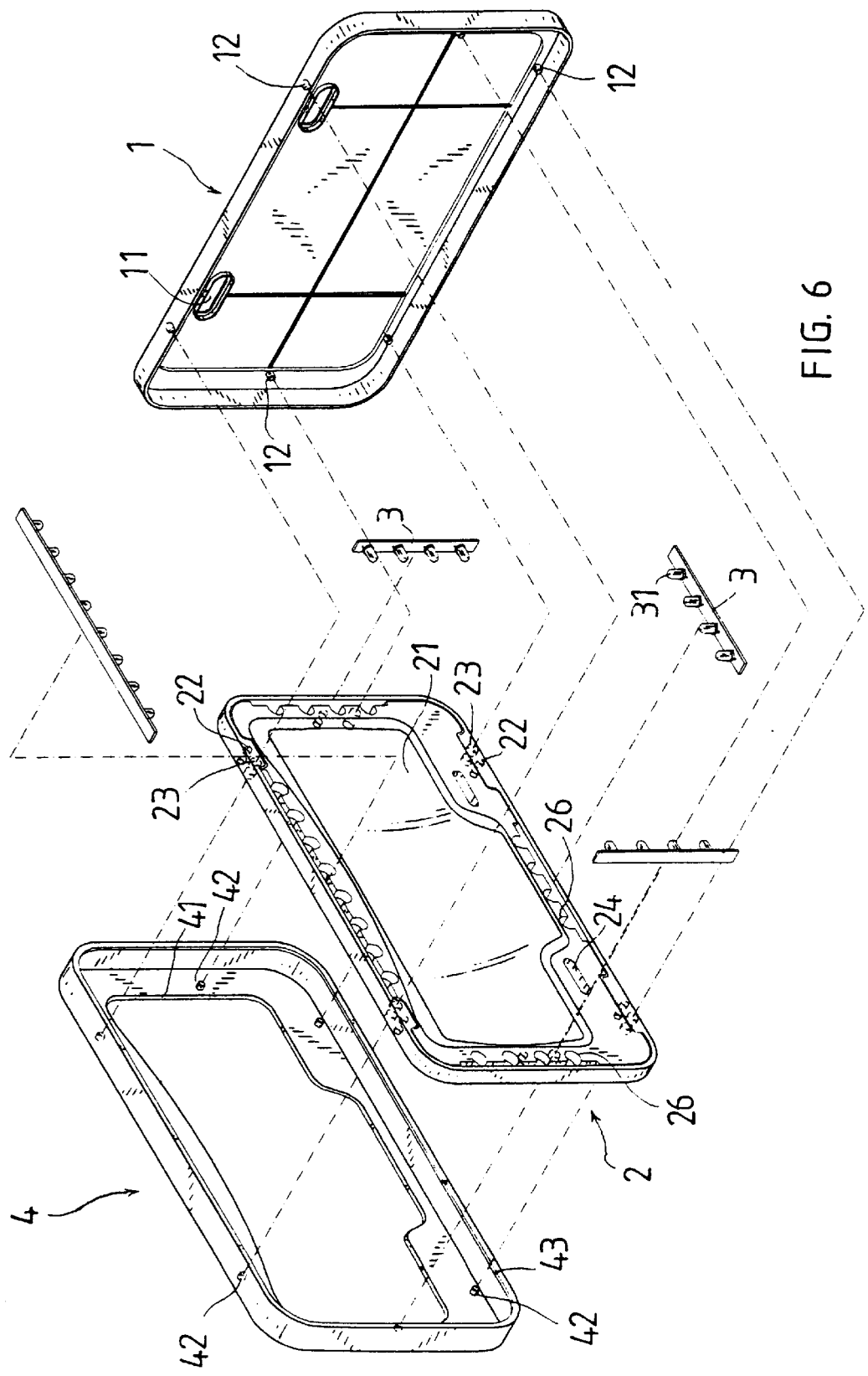
FIG. 6 is an exploded perspective showing the positions of different members of the present invention for packing purpose.

The middle member 2 is made of highly transparent acrylic material or any other suitable transparent material, so that lights can pass through and be guided and/or refracted by the middle member 2. The middle member 2 includes an outer frame portion and a central convexo-convex portion 21. First stud receiving holes 22 are provided on the frame portion of the middle member 2 at positions corresponding to the studs 12 on the back member 1 for engaging with the studs 12 in tight fit manner. Second stud receiving holes 23 having a diameter slightly larger than that of the first stud receiving holes 22 are also provided on the middle member 2 respectively adjacent to the first stud receiving holes 22. Each of the first and the second stud receiving holes 22, 23 may be formed from a through hole or two axially aligned blind holes. The studs 12 on the back member 1 near the upper and lower side walls are adequately spaced but asymmetrically arranged and the studs 12 near the left and right side walls are symmetrically arranged but offsetting from middle points of the left and right sides of the back member 1, such that the members forming the number plate housing of the present invention can be more easily packed by turning the middle member 2 and the front member 4 upside down, as shown in FIG. 6, so that the large-diameter second stud receiving holes 23 on the middle member 2 loosely engage with the studs 12 on the back member 1 to temporarily hold the members in place. Through holes 24 are provided on the frame portion of the middle member 2 corresponding to the fixing holes 52 of the number plate 5, too. To conceal electric wires of the number plate housing from view, a continuous wire groove 25 is provided on a back side of the middle member 2 along an outer periphery of the frame portion. The frame portion of the middle member 2 is also provided along the outer periphery thereof with a series of light receiving holes 26, so that light emitting diodes (LED's) 31 lined on the light units 3 can be separately set in the light receiving holes 26. The light units 3 may be firmly set on the frame portion of the middle member 2 either by applying heat sealed glue between them or by engaging male and female means separately provided on the frame portion of the middle member 2 and the light units 3. The central convexo-convex portion 21 of the middle member 2 serves as a magnifier to desirably magnify the numbers on the number plate 5 for easy reading, as shown in FIG. 5.

The front member 4 is in the form of a frame defining a front opening 41 having a size suitable for framing the central convexo-convex portion 21 of the middle member 2. Backward projected studs 42 are provided on an inner side of the front member 4 corresponding to the studs 12 on the back member 1, so that they can be fitted into the first stud receiving holes 22 from a front side of the middle member 2 to assemble the front and the middle members 4 and 2, and, an inward extended flange 43 is formed along a rear outer periphery of the front member 4 for engaging with the stepped recess 13 of the back member 1. With these arrangements, when the middle member 2, the number plate 5, and the back member 1 are sequentially assembled and fixed in place by threading screws through the holes 24, 52, and 11, the front member 4 may be tightly fitted over the middle member 2 to completely and tightly seal the entire assembly of the number plate housing. When packing the members of the number plate housing of the present invention, the front member 4 is also turned upside down for the studs 42 to loosely engage with the large-diameter second stud receiving holes 23 on the middle member 2.

Figure 4:
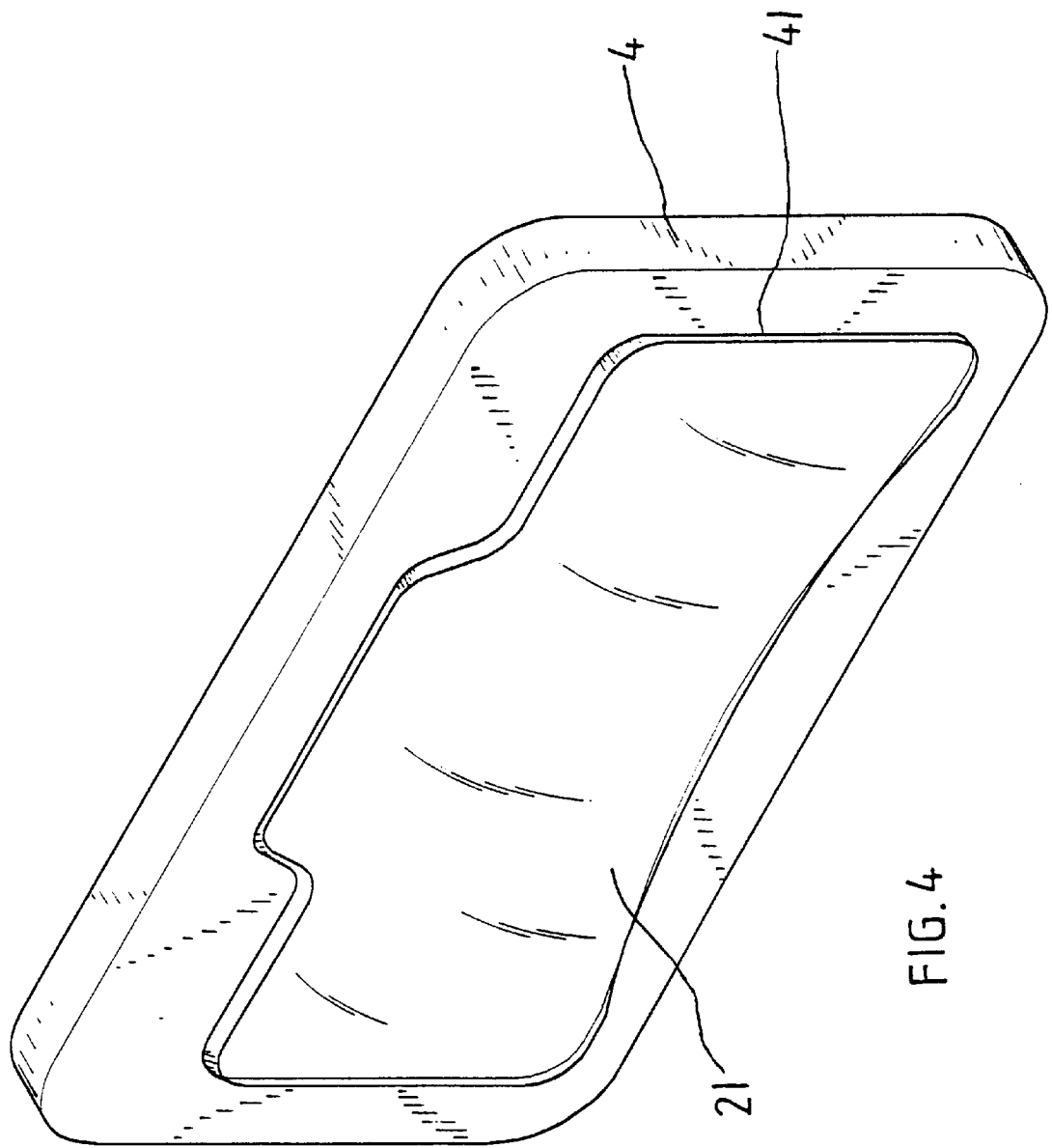
FIG. 4 is an assembled perspective of the present invention.

FIG. 4 illustrates an assembled number plate housing according to the present invention. And, FIG. 5 illustrates a number plate housing of the present invention with a number plate set therein. As can be seen from FIGS. 3, 4 and 5, the assembled number plate housing has a smoothy curved front surface provided by the convexo-convex portion 21 of the middle member 2 and can therefore be easily and quickly cleaned and maintained. Due to the tightly sealed structure of the whole number plate housing, an internal space thereof, and accordingly, the number plate 5 set therein, is not subject to contamination by dust.

It is generally known that a number plate 5 is rarely dismounted after it is mounted on a car or motorcycle. In view of this fact, the number plate housing of the present invention is so structured that it is very difficult to be dismounted from the car or motorcycle once it has been mounted thereto. However, it can still be dismounted by means of adequate tools when it is necessary.

Figure 2:
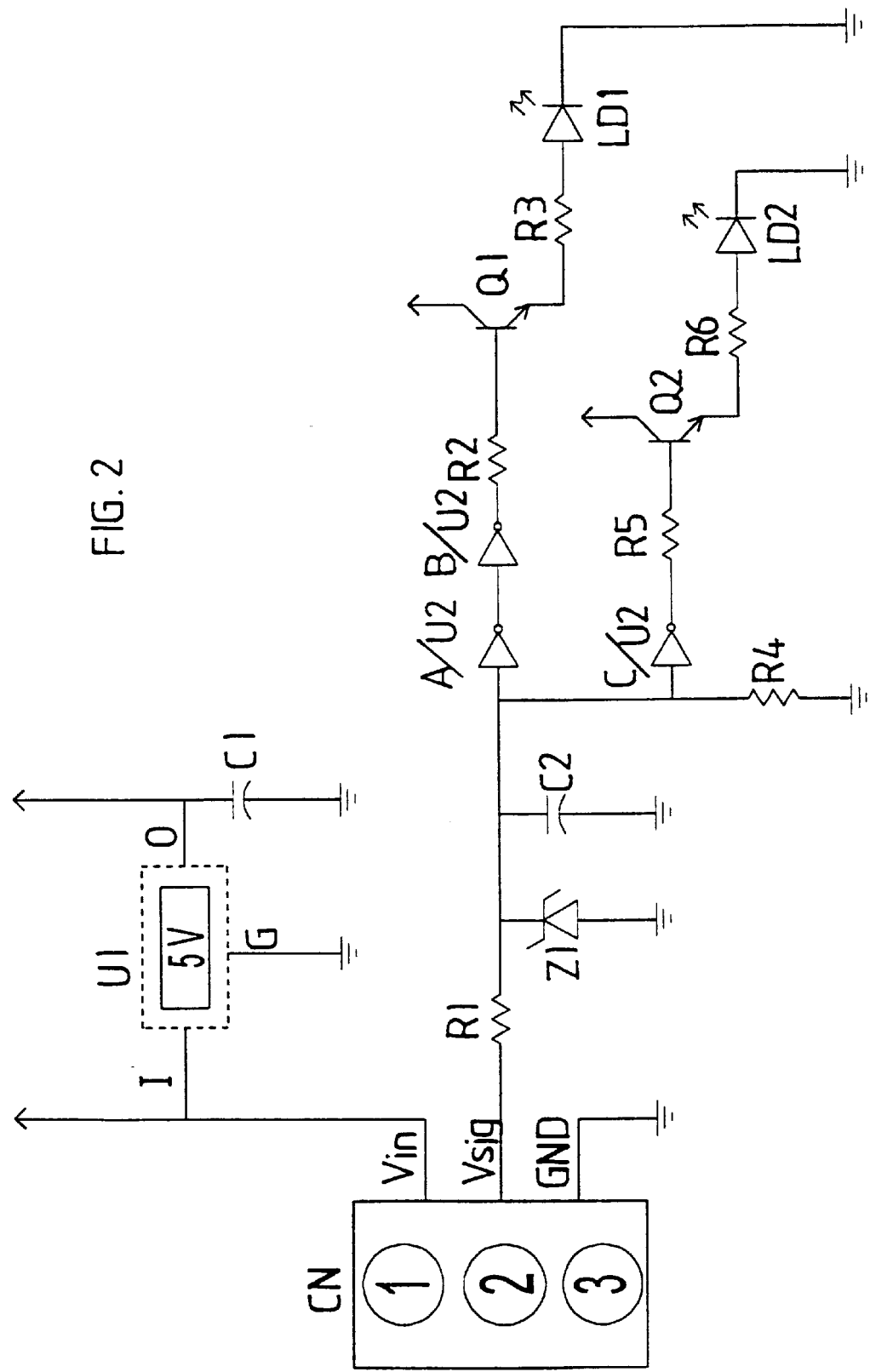
FIG. 2 is a circuit diagram of a number plate housing of the present invention.

FIG. 2 is a circuit diagram of the number plate housing of the present invention. Since the electrical connection of the present invention is generally similar to other conventional electrical connection, it is incorporated herein only for reference.

With the above arrangements, the number plate housing of the present invention has the functions of magnifying the numbers on the number plate, illuminating the number plate in the dark, and serving as a tail or brake light. The number plate housing can be easily cleaned and enables easy reading of the numbers on the plate during day and night.

The number plate is sealed in the number plate housing and is therefore isolated from dust. The structure of the present invention allows the number plate housing and the number plate set therein to be securely attached to the car or motorcycle without being easily removed by thieves. Moreover, the LED's 31 on the light units 3 may have different colors so that they shine differently during normal driving and during braking. The number plate housing of the present invention facilitates good management and control of the vehicles and provides enhanced safety during driving.

What is to be noted is the present invention described above is to be taken as a preferred embodiment of the invention and that various changes in the arrangements maybe resorted to without departing from the spirit of the invention or the scope of the subjoined claims.

What is claimed is:

1. A number plate housing for receiving therein a number plate having fixing holes, comprising:

a back member in the form of a shallow tray into which said number plate is set, said back member being provided on a back wall thereof with through holes corresponding to said fixing holes on said number plate and a plurality of forward extended studs at predetermined points, and a continuous stepped recess being provided along a rear outer periphery of said back member;

a middle member made of transparent material and having a central convexo-convex portion to provide optical waveguide and refraction functions, said middle member being provided at predetermined positions with light receiving holes and an electrical wire groove for receiving electrical wires therein, a plurality of first stud receiving holes being formed on said middle member corresponding to said a plurality of studs on said back member, and a plurality of second stud receiving holes being formed adjacent to said first stud receiving holes and having a diameter slightly larger than that of said first stud receiving holes, such that said studs on said back member may loosely engage with said second stud receiving holes when said middle member is turned upside down;

a plurality of light units each having multiple light emitting diodes lined thereon for mounting into said light receiving holes on said middle member, such that said light emitting diodes are connected to said electrical wires in said wire receiving groove on said middle member to form a circuit of said number plate housing for illuminating said number plate; and a front member in the form of a frame for fitly covering onto and sealing an assembly of said middle member, said number plate, and said back member; said front member defining a front opening suitable for framing said central convexo-convex portion of said middle member, said front member being provided on an inner side at predetermined points with a plurality of backward extended studs corresponding to said first stud receiving holes on said middle member, an inward extended flange being provided along a rear outer periphery of said front member for tightly engaging with said stepped recess on said back member;

whereby when said number plate is set in said back member and said front and said middle members are sequentially assembled to said back member by tight engagement of said studs on said front and said back members with said first stud receiving holes on said middle member and said inward extended flange on said front member with said stepped recess on said back member, said number plate is protected from dust and thieves and numbers on said number plate are magnified by said central convexo-convex portion of said middle member for easy reading.

2. A number plate housing as claimed in claim 1, wherein said studs on said back and said front members are in the number of six each, two of said six studs being symmetrically provided near left and right sides of said front and said back members at predetermined points and the other four of said six studs forming two pairs which are separately and asymmetrically provided near upper and lower sides of said front and said back members at predetermined points.

3. A number plate housing as claimed in claim 1, wherein said first and said second stud receiving holes on said middle member are in the number of six pairs, two of said six pairs of said first and said second stud receiving holes being symmetrically provided near left and right sides of said middle member at predetermined points, and the other four of said six pairs of said first and said second stud receiving holes forming two groups which are separately and asymmetrically provided near upper and lower sides of said middle member at predetermined points.

4. A number plate housing as claimed in claim 1, wherein each of said first and said second stud receiving holes includes two axially aligned blind holes.

5. A number plate housing as claimed in claim 1, wherein each of said first and said second stud receiving holes includes a through hole.

6. A number plate housing as claimed in claim 1, wherein said a plurality of light units are fixedly mounted into said light receiving holes on said middle member by means of heat sealed glue or general adhesives.

7. A number plate housing as claimed in claim 1, wherein said a plurality of light units are fixedly mounted into said light receiving holes on said middle member by engagement of male or female means provided on said light units with female or male means provided on said middle member.

8. A number plate housing as claimed in claim 1, wherein said light emitting diodes on said a plurality of light units are grouped into two or more colors, such that said light emitting diodes grouped in one color shine in normal driving condition and other said emitting diodes grouped in another color serve as brake light.

* * * * *